United States Patent [19]

McLendon, Jr.

[11] Patent Number: 4,597,302

[45] Date of Patent: Jul. 1, 1986

[54] MOTION INTERCONVERSION APPARATUS

[76] Inventor: Martin McLendon, Jr., 11173 Kelowna St. #61, San Diego, Calif. 92126

[21] Appl. No.: 311,733

[22] Filed: Oct. 15, 1981

[51] Int. Cl.$^4$ .................... F16H 25/12; F16H 25/16
[52] U.S. Cl. ............................................ 74/57; 74/569
[58] Field of Search ............... 74/56, 57, 58, 60, 567, 74/569

[56] References Cited

U.S. PATENT DOCUMENTS

| | | | |
|---|---|---|---|
| 998,363 | 7/1911 | DeLukacsevics | 74/57 |
| 1,239,310 | 9/1917 | Shepard | 74/57 |
| 1,565,184 | 12/1925 | Miller | 74/57 |
| 1,762,437 | 6/1930 | Franklin | 74/57 |
| 1,896,449 | 2/1933 | Kreidler | 74/56 |
| 1,948,526 | 2/1934 | Liles | 74/57 |
| 1,985,901 | 1/1935 | Liles | 74/57 |
| 2,436,692 | 2/1948 | Greene | 74/57 |
| 2,550,612 | 4/1951 | Sparmann | 74/60 |
| 3,069,913 | 12/1962 | McCrory et al. | 74/60 |
| 3,135,166 | 6/1964 | Born | 91/175 |
| 3,260,289 | 7/1966 | Whitten | 74/57 |
| 3,263,513 | 8/1966 | Girodin | 74/60 |
| 3,356,080 | 12/1967 | Howard | 123/48 |
| 3,946,617 | 3/1976 | Moriarty | 74/60 |
| 4,077,269 | 3/1978 | Hodgkinson | 74/60 |

FOREIGN PATENT DOCUMENTS

| | | | |
|---|---|---|---|
| 844129 | 4/1939 | France | 74/56 |
| 2368 | of 1887 | United Kingdom | 74/57 |

Primary Examiner—Lawrence J. Staab
Attorney, Agent, or Firm—Charles C. Logan

[57] ABSTRACT

Apparatus for interconverting reciprocating and rotative motion is comprised of a cylindrical rotative slant having a continuous groove in a flat inclined surface and another continuous groove in the cylindrical sidewall adjacent said inclined surface. Balls are caused to engage said grooves, said balls being held stationary by retaining means adapted to undergo reciprocal linear motion within a track means. An axle is centered in a flat surface perpendicular to the axis of said rotative slant.

6 Claims, 6 Drawing Figures

MOTION INTERCONVERSION APPARATUS

BACKGROUND OF THE INVENTION

This invention relates to apparatus for the interconversion of reciprocal and rotary motions, and more particularly to an apparatus for interconverting motion between a rotary axis and a system in reciprocal motion in a path parallel to said rotary axis.

In crankless motion conversion mechanisms, reciprocating motion is converted into rotary motion, or vice versa occasionally by the use of a rotative slant also known as a swash plate. Such motion interconverting devices may be utilized in conjunction with internal combustion engines of 2 or 4 cycle or diesel design, steam engines, sterling cycle engines, external combustion engines, fluid compressing devices, and other machines.

Binding problems are however encountered in certain phases of the circular motion of the rotative slant, depending upon the nature of the associated components which couple to the reciprocating system. The binding or uneven stress distribution in the rotative member promote diminished efficiency and durability.

It is accordingly an object of the present invention to provide apparatus for the interconversion of reciprocal and rotary motion having improved efficiency of operation and durability.

It is a further object of this invention to provide apparatus of the aforesaid nature of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by an improved apparatus which comprises a rotative slant having the partial configuration of a right circular cylinder having a circular sidewall, a first flat boundary end surface disposed perpendicularly to the rotational center axis of the cylinder, and a second flat boundary end surface disposed at an angle of between about 20° and 40° with respect to said first boundary surface. An axle is perpendicularly attached to the center of said first end surface, and extends away from said rotative slant. A first continuous groove is recessed into said sidewall substantially parallel to said second end surface and adjacent thereto, said groove having a uniform cross section in the form of a circular arc. A second continuous groove is recessed into said second end surface, substantially parallel to said sidewall and adjacent thereto, said second groove having a uniform cross section in the form of a circular arc.

Separate balls of hard metal such as steel, chrome molybdenum, and the like are caused to ride within said first and second grooves, said balls being held stationary by retaining means which house said balls in cup-like depressions while permitting free rotation of the balls. Said retaining means also engage a straight track which constrains said retaining means to reciprocating linear motion along a line parallel to the axis of said cylinder. The retaining means are also attached to a rigid extension associated with a mechanism such as a piston undergoing reciprocal motion.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
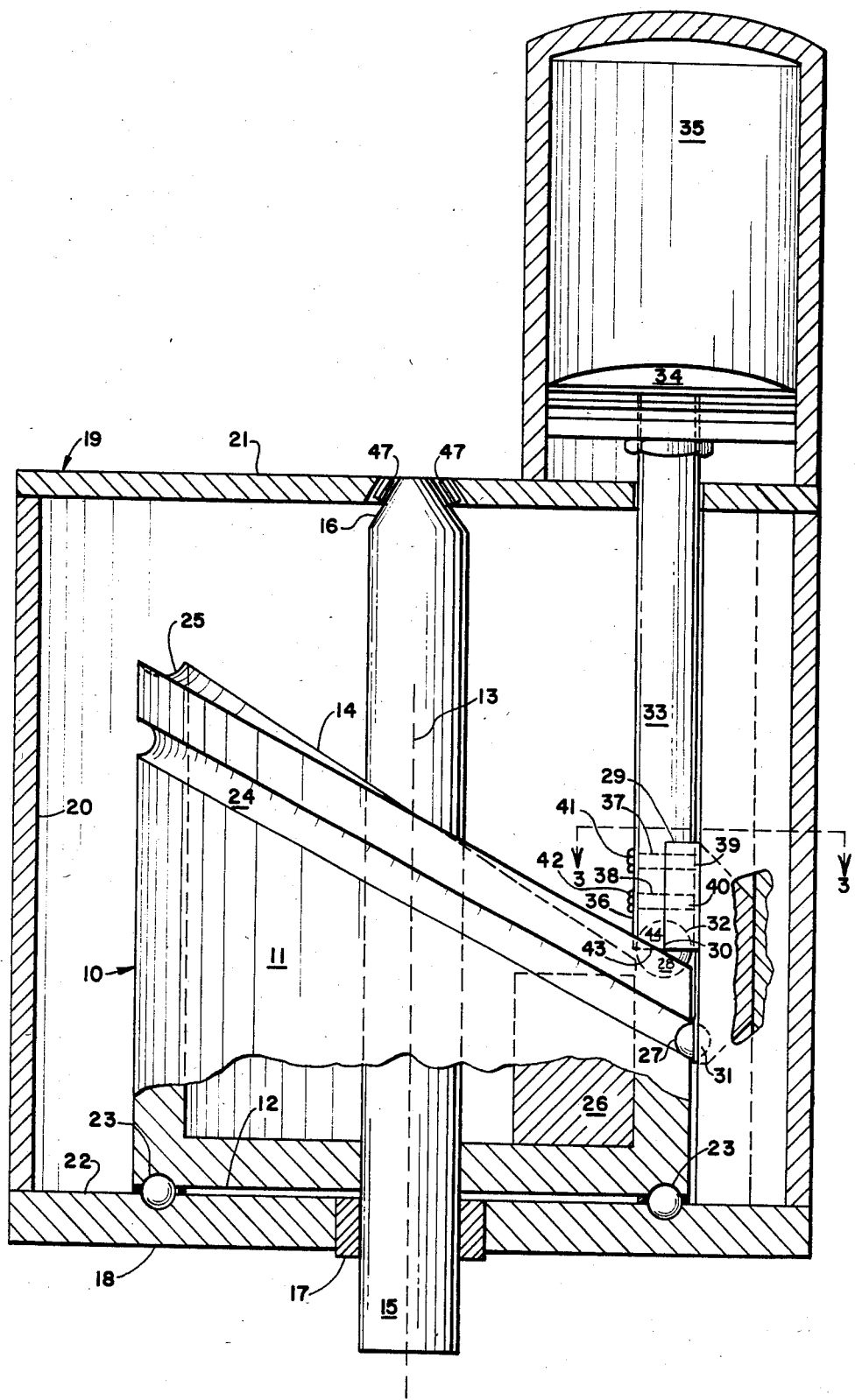
FIG. 1 is a side view of an embodiment of apparatus of this invention shown partially in section and with parts broken away to reveal interior detail.
Figure 2:
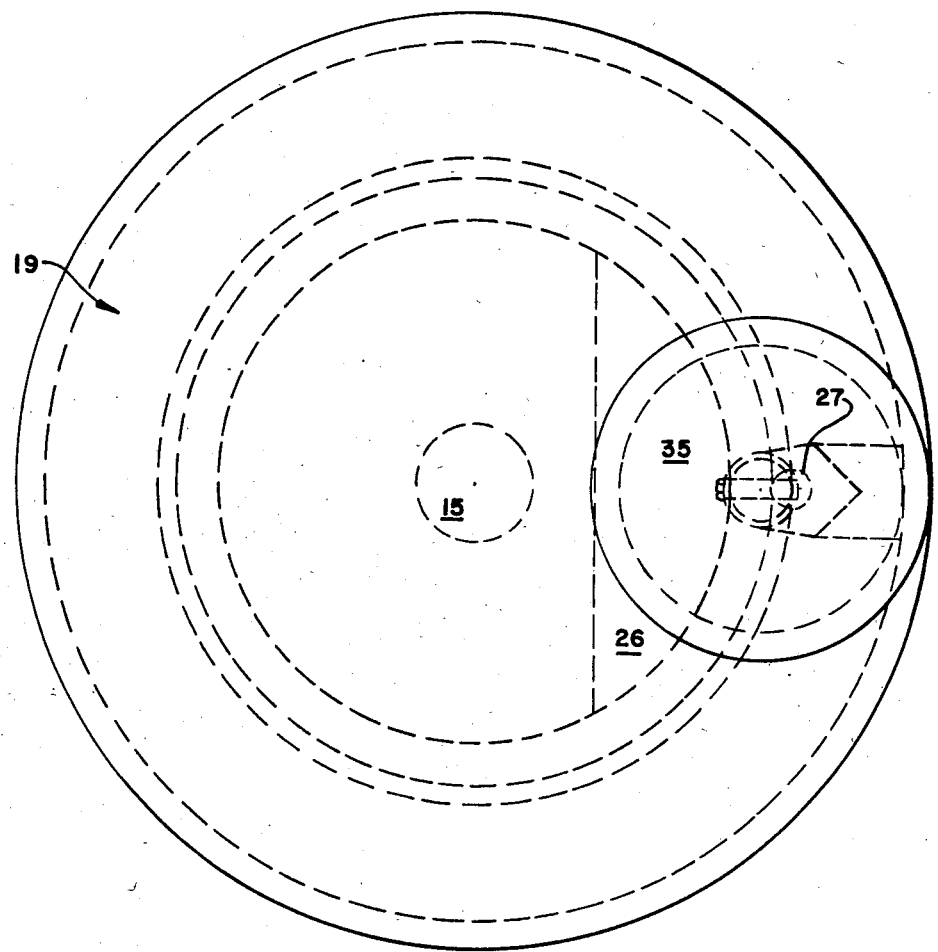
FIG. 2 is a top view of the embodiment of FIG. 1.

Referring to FIG. 1, an embodiment of the apparatus of this invention is shown comprised of hollow rotative slant 10 comprised of circular cylindrical sidewall 11, lower flat end surface 12 disposed perpendicularly to center axis 13, and upper flat end surface 14 inclined at an angle of about 30° with respect to lower surface 12. The rotative slant is confined within an outer enclosure 19 comprised of bottom panel 18, lid member 21 and encircling sidewall 20. An axle 15 is perpendicularly attached to the center of lower surface 12 and passes through bushing 17 or equivalent friction-reducing means in bottom panel 18. The axle also extends upwardly through said rotative slant to an upper extremity 16 which is rotatively positioned by upper bearing means such as roller bearings 47 in lid member 21.

Positioned between lower surface 12 and the inside face 22 of bottom panel 18 are lower bearing means 23 equiangularly spaced about the periphery of said lower surface. The function of said bearing means is to support said rotative slant at a fixed distance above bottom panel 18 while permitting unrestricted rotative movement of the rotative slant and minimizing frictional interaction with said bottom panel.

A continuous outside groove 24 is recessed into the sidewall 11 adjacent and substantially parallel to upper surface 14. Said groove has a substantially uniform cross section throughout its extent, said cross section being an arc of a circle. A continuous top groove 25 is recessed into upper surface 14 adjacent and substantially parallel to sidewall 11.

In the illustrated embodiment, the rotative slant is a hollow structure. It may in other embodiments, however, be a solid structure. Regardless of whether the rotative slant is hollow or solid, a counterweight 26 is positioned within the structure adjacent the lowest extremity of inclined upper surface 14. The purpose of the counterweight is to cause the rotative slant to be centrifugally balanced with respect to rotation about its axis 13. Apertures may exist in sidewall 11 to permit passage of lubricating oils.

A first spherical ball 27 is adapted to ride in outside groove 24. A second spherical ball 28 is adapted to ride in top groove 25. Ball 27 is held in position within its groove by retaining means in the form of coupling slide 29 comprised of a front portion 30 having lower holding means in the form of socket 31 of substantially hemispherical contour adapted to accommodate ball 27. Ball 28 is held in position within its groove by hemispherical upper socket 32 formed in the lower extremity of extension rod 33. It is to be noted that upper socket 32 protrudes forwardly of lower socket 31 and in this manner is adapted to constrain ball 28 to ride in top groove 25.

The extension rod 33 is a straight rigid member depending from piston 34 engaging power cylinder 35. Said rod 33 is oriented toward said rotative slant and parallel to axis 13. The distal or lower extremity 36 of rod 33 is indented and provided with holes 37 and 38 which align with threaded holes 39 and 40 respectively in the upper portion of coupling slide 29. Threaded bolts 41 and 42 attach the distal extremity of rod 33 to coupling slide 29.

Figure 3:
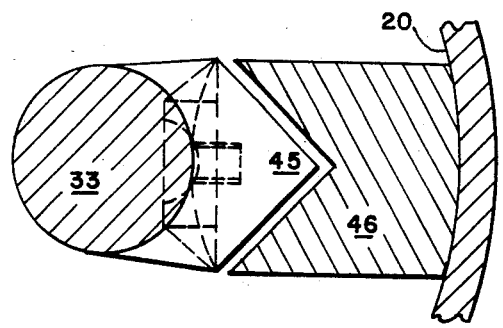
FIG. 3 is an enlarged sectional view taken along the line 3—3 of FIG. 1.
Figure 5:
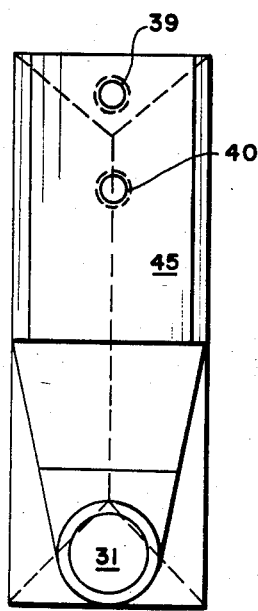
FIG. 5 is a front view of the coupling slide component of FIG. 1.
Figure 4:
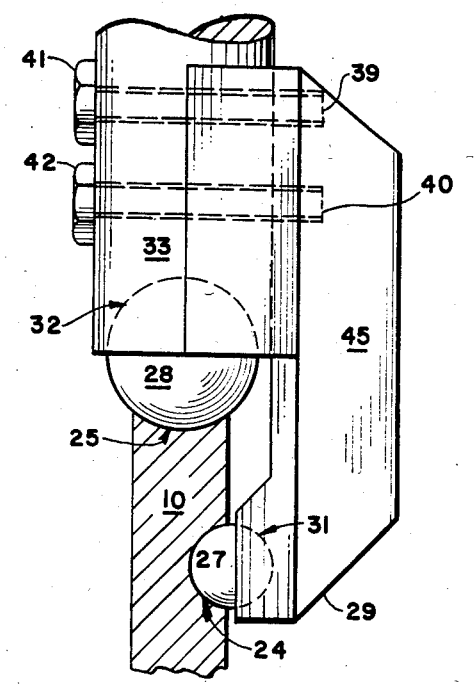
FIG. 4 is an enlarged side view of the coupling slide component of the embodiment of FIG. 1 and parts interactive therewith.

The rearward portion of coupling slide 29, best seen in FIGS. 3, 4 and 5, is comprised of an elongated V-shaped block 45 adapted to fit in sliding relationship within the V-shaped trough of track 46 extending from top to bottom of housing 19 and adjacent the sidewall thereof.

In operation, reciprocal motion of rod 33 causes corresponding motion of coupling slide 29 within track 46. Balls 27 and 28, acting within their respective grooves, cause rotation of the rotative slant 10 about axle 15, thereby converting the reciprocal motion to rotary motion. Conversely, if an input rotary force were applied to axle 15, it would be similarly converted to a reciprocating motion in rod 33.

Figure 6:
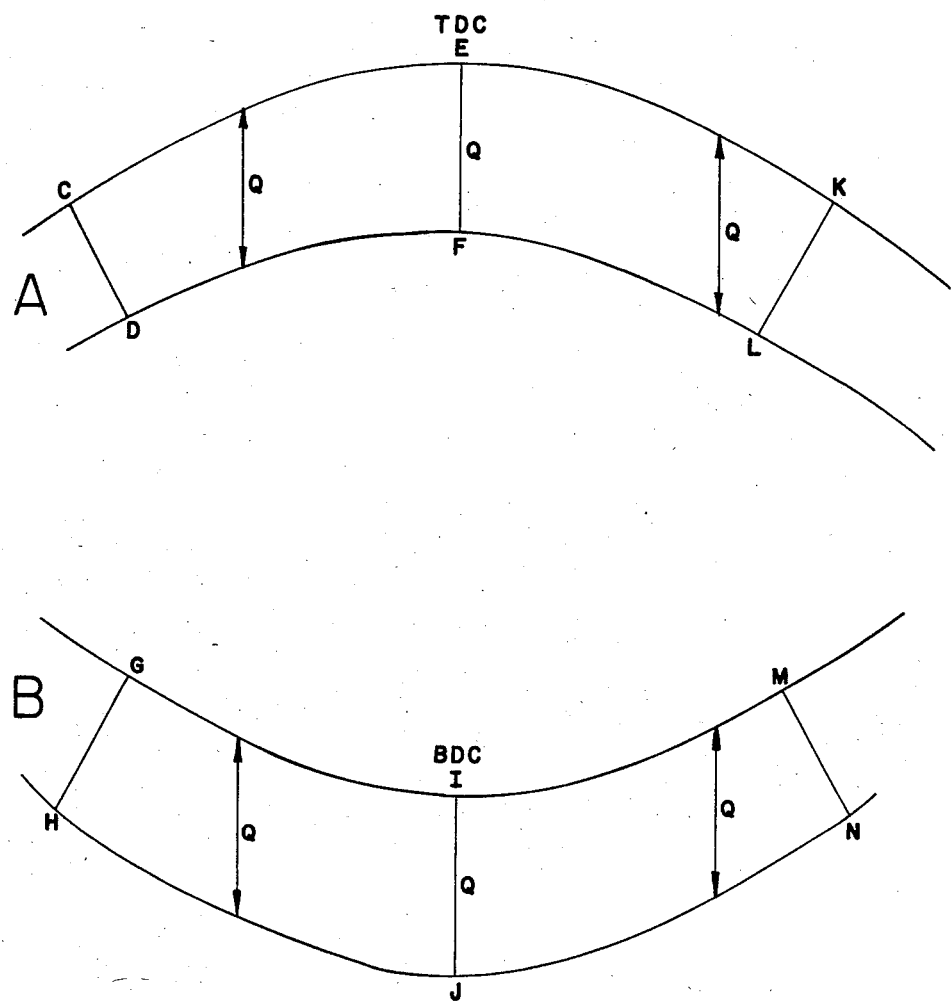
FIG. 6 is a schematic diagram showing the spatial relationships of the two grooves of the embodiment of FIG. 1.

It is to be noted that the distance between upper and lower balls remains constant because of their fixed positions within upper and lower holding means within said retaining means. Because of the varying acceleration in the course of the oscillating characteristics of reciprocal motion, the distance taken perpendicularly between centerlines of the top and side grooves will of necessity vary throughout their circuits. Such relationship is illustrated in FIG. 6 wherein the fixed distance between the centers of upper and lower balls is designated Q. In said illustration, lines A and B represent the center lines of the top groove and the side groove respectively at the uppermost portion of upper flat surface 14. Lines $A_1$ and $B_1$ represent the center lines of the top groove and side groove respectively at the lowermost portion of flat surface 14. The configuration of lines A, B, $A_1$ and $B_1$ in FIG. 6 illustrate that, although the vertical spacing Q between the lines remains constant, the perpendicular separation between the lines changes. For example, the spacing measured perpendicularly between the grooves and represented by letter-designated lines is such that EF>CD and CD=KL, IJ>GH and GH=MN.

In the course of operation, the extreme position of the reciprocating motion in the direction of the rotative slant corresponds to engagement of the grooves at their lowermost position. Conversely, the opposite extreme position of the reciprocating motion corresponds to engagement of the grooves at their uppermost position.

Although the illustrated embodiment shows only one piston mechanism associated with the rotative slant, it is to be understood that multiple piston mechanisms, namely about 2 to 5, may be associated with a single rotative slant, said piston mechanisms being equiangularly spaced about axis 13 and synchronized to deliver or receive power in sequence. It is also to be noted that, although expressions such as "upper" and "lower" have been used for clarity of definition, the apparatus can be utilized in any orientation relative to horizontal.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for the interconversion of reciprocal and rotary motion comprising:
    (a) a rotative slant having a circular cylindrical sidewall, a first flat boundary surface disposed perpendicularly to the center axis of said side wall, and a second flat boundary surface inclined at an angle of between 20 degrees and 40 degrees with respect to said first boundary surface;
    (b) a first continuous groove recessed into said side wall substantially parallel to said second surface and adjacent thereto, said groove having a uniform cross-sectional configuration in the form of a circular arc;
    (c) a second continuous groove recessed into said second boundary surface substantially parallel to said side wall and adjacent thereto, said second groove having a uniform cross-section in the form of a circular arc;
    (d) an axle perpendicularly attached to the center of said first boundary surface;
    (e) a piston rod aligned laterally offset from and parallel to the longitudinal axis of said axle, said piston rod having a substantially hemispherical upper socket formed in its bottom end;
    (f) a first ball adapted to ride within said first groove, and a second ball adapted to have its bottom surface ride within said second groove and its top surface constrained in the upper socket formed in the bottom end of said piston rod;
    (g) retaining means which houses one lateral side of said first ball and maintains it in said first groove while permitting free rotation therein;
    (h) straight elongated track means oriented parallel to said center axis;
    (i) track engaging means associated with said retaining means and adapted to constrain said retaining means to sliding movement along said track means; and
    (j) said piston rod adapted to connect said retaining means with a piston capable of undergoing reciprocal motion.

2. The apparatus of claim 1 enclosed by a housing having a bottom, top and connecting sidewall.

3. The apparatus of claim 2 wherein friction-reducing means are interposed between said first boundary surface and the bottom of said housing.

4. The apparatus of claim 3 wherein more than one mechanism capable of undergoing reciprocal motion is associated with said rotative slant.

5. The apparatus of claim 2 wherein said rotative slant is hollow.

6. The apparatus of claim 5 wherein said axle passes through said rotative slant and is rotatively positioned by friction-reducing means in the bottom and top of said housing.

* * * * *